United States Patent
Funahashi

(10) Patent No.: US 9,465,266 B2
(45) Date of Patent: Oct. 11, 2016

(54) LIQUID CRYSTAL DISPLAY DEVICE

(71) Applicant: Panasonic Liquid Crystal Display Co., Ltd., Himeji-shi, Hyogo (JP)

(72) Inventor: Yuuta Funahashi, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 109 days.

(21) Appl. No.: 14/170,646

(22) Filed: Feb. 3, 2014

(65) Prior Publication Data

US 2014/0218653 A1    Aug. 7, 2014

(30) Foreign Application Priority Data

Feb. 4, 2013    (JP) .................................. 2013-019223

(51) Int. Cl.
*G02F 1/1345* (2006.01)

(52) U.S. Cl.
CPC ................. *G02F 1/13458* (2013.01)

(58) Field of Classification Search
CPC . G02F 1/1345; G02F 1/13458; G02F 1/1368
See application file for complete search history.

(56) References Cited

U.S. PATENT DOCUMENTS

| 6,078,366 | A | * | 6/2000 | Dohjo | .................. G02F 1/1345 257/59 |
| 6,683,669 | B1 | | 1/2004 | Fujikawa | |
| 7,009,676 | B1 | * | 3/2006 | Kim | .............................. 349/158 |
| 2008/0002130 | A1 | * | 1/2008 | Kil | ................................ 349/149 |

FOREIGN PATENT DOCUMENTS

JP    2009-229969 A    10/2009

* cited by examiner

*Primary Examiner* — Paisley L Arendt
*Assistant Examiner* — Edmond Lau
(74) *Attorney, Agent, or Firm* — Hubbs, Enatsky & Inoue PLLC

(57) ABSTRACT

To provide a liquid crystal display device capable of improving protection of a wire connected to a group of terminals, a TFT substrate has, on the side of a liquid crystal layer, a plurality of wires extending from an overlap part A to a non-overlap part B, a protective film covering the plurality of wires, a plurality of protective conductor lines formed on the protective film, each corresponding to each wire and lying across the boundary between the overlap part A and the non-overlap part B, a protective film covering the plurality of protective conductor lines, and a group of terminals formed on the non-overlap part B and connected to the plurality of wires.

18 Claims, 8 Drawing Sheets

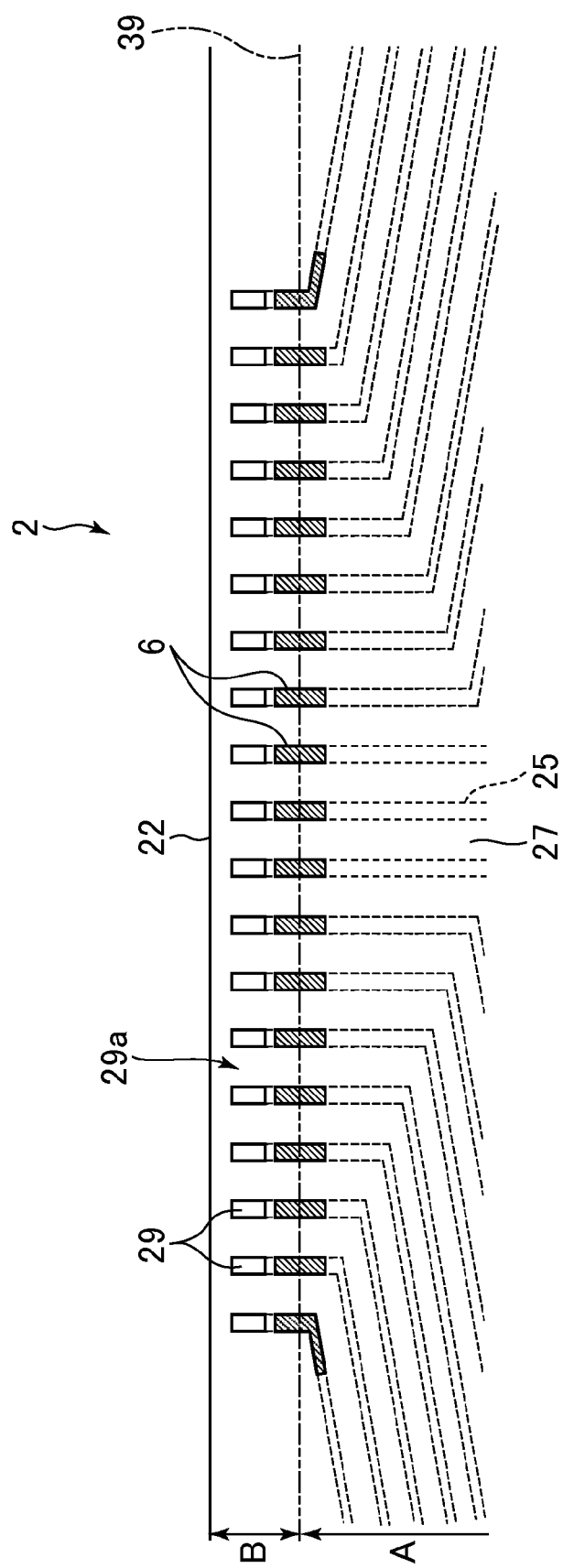

LIQUID CRYSTAL DISPLAY DEVICE

CROSS-REFERENCE TO RELATED APPLICATION

The present application claims priority from Japanese application JP2013-019223 filed on Feb. 4, 2013, the entire content of which is hereby incorporated by reference into this application.

TECHNICAL FIELD

This application relates to a liquid crystal display device, and in particular to protection of a wire.

BACKGROUND

In a liquid crystal display device, a liquid crystal layer is held between two substrates. Of the two substrates, one substrate has a non-overlap part that does not overlap with the other substrate. A group of terminals connected to a plurality of wires extending from pixels are formed on the non-overlap part. The plurality of wires are covered by a protective film for preventing corrosion.

A substrate having a plurality of wires as above may receive mechanical impact during panel assembly process or panel cutting process. This impact may cause scraping-off of the protective film on a surface layer, and then a wire may be partially exposed to the air. If that happens, corrosion may progress from the exposed part, which may result in deterioration of electric conductivity. This problem is likely to happen especially around the terminals, because swarf is generated when cutting off the opposite substrate.

Japanese Patent Laid-open Publication No. 2009-229969 discloses that a protective member made of resin is provided to a part corresponding to a cutting line. Although it is preferable in view of wire protection that the protective member contains conductive material, such as metal, a short circuit possibly occurs between the wire and the protective member, if a protective member contains conductive material.

The application has been conceived in view of the above described situation, and aims to provide a liquid crystal display device capable of improving protection of a wire connected to terminals.

SUMMARY

In one general aspect, the instant application describes a liquid crystal display device includes a first substrate; a second substrate; a liquid crystal layer held between the first substrate and the second substrate; and a seal member sandwiched by the first substrate and the second substrate, for enclosing the liquid crystal layer, wherein the first substrate includes an overlap part that overlaps with the second substrate and a non-overlap part that does not overlap with the second substrate, a plurality of wires extending from the overlap part to the non-overlap part on a side of the liquid crystal layer, a first protective film covering the plurality of wires, a plurality of protective conductor lines formed on the first protective film so as to correspond to each of the wires and lie across a boundary between the overlap part and the non-overlap part, a second protective film covering the plurality of protective conductor lines, and a group of terminals formed on the non-overlap part and connected to the plurality of wires.

The above general aspect may include one or more of the following features. The protective conductor line may overlap with a corresponding wire in a plan view.

The protective conductor line may include a transparent conductive film made of oxide.

The first substrate may further include a thin film transistor connected to one of the plurality of wires and covered by the first protective film and a first transparent electrode formed on the first protective film, and the transparent conductive film of the protective conductor line may be made of the same material as that of the first transparent electrode.

The protective conductor line may include a transparent conductive film made of oxide and a metal film formed on the transparent conductive film.

The first substrate may further include a thin film transistor connected to one of the plurality of wires and covered by the first protective film, a first transparent electrode formed on the first protective film, and a metal wire formed on the first transparent electrode, the transparent conductive film of the protective conductor line may be made of the same material as that of the first transparent electrode, and the metal film of the protective conductor line may be made of the same material as that of the metal wire.

The first substrate may further include a thin film transistor connected to one of the plurality of wires and covered by the first protective film, a first transparent electrode formed on the first protective film, and a metal wire formed on the first transparent electrode, and the protective conductor line may be made of the same material as that of the metal wire.

The protective conductor line may be electrically connected to the wire via a connection conductor having a first via section connected to the wire through the first protective film and the second protective film, and a second via section connected to the protective conductor line through the second protective film.

The first substrate may further include a thin film transistor connected to one of the plurality of wires and covered by the first protective film, and a second transparent electrode formed on the second protective film, and the connection conductor is made of the same material as that of the second transparent electrode.

The protective conductor line may be electrically connected to a corresponding wire at only one point.

According to this application, with a plurality of protective conductor lines disposed across the boundary between the overlap part and the non-overlap part and corresponding to each wires, it is possible to improve protection of the wires connected to the terminals. Further, as the plurality of protective conductor lines are connected to the respective wires, it is possible to prevent short circuit.

BRIEF DESCRIPTION OF THE DRAWINGS

FIG. 2 is a plan view schematically showing major parts of a TFT substrate;

DETAILED DESCRIPTION

An embodiment of a liquid crystal display device according to this application is herein described with reference to the drawings.

Figure 1:
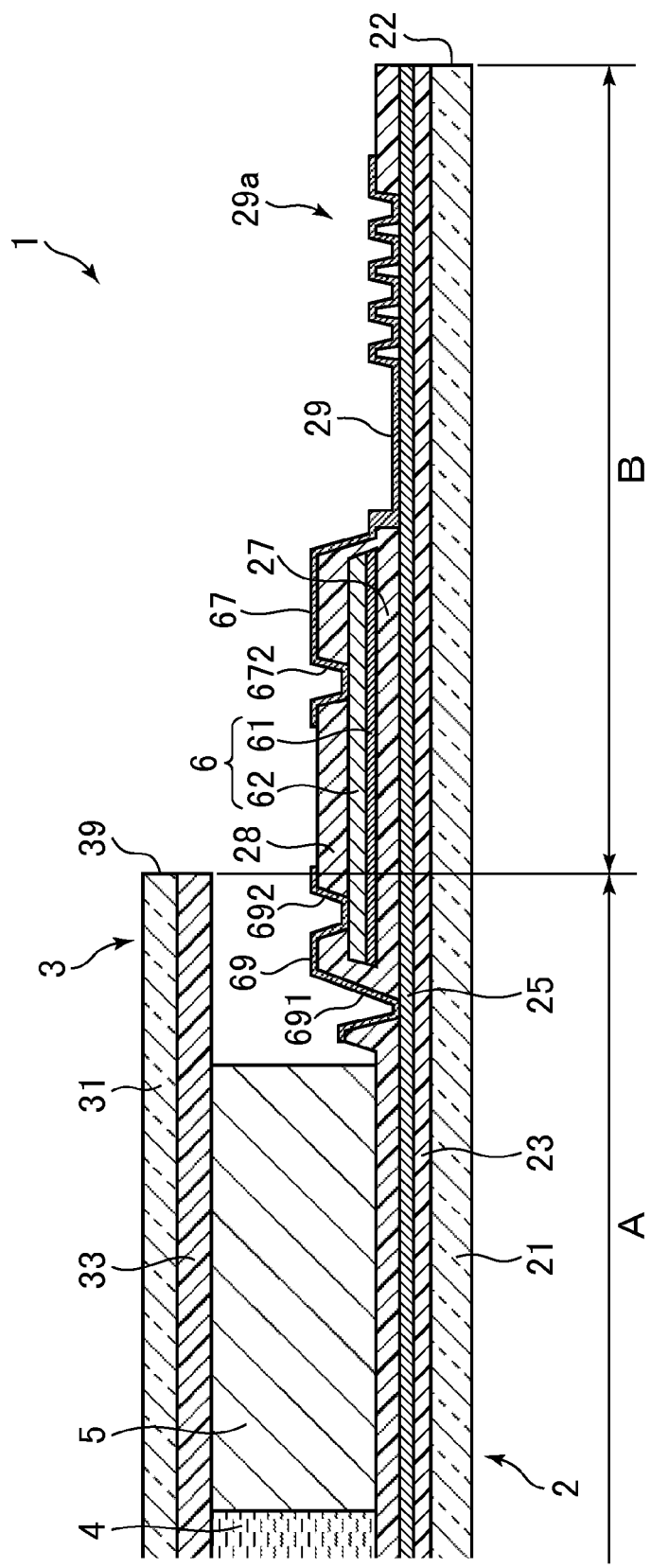
FIG. 1 is a cross sectional view schematically showing major parts of a liquid crystal display device.

FIG. 1 is a cross sectional view schematically showing major parts of a liquid crystal display device 1. FIG. 2 is a plan view schematically showing major parts of a TFT substrate 2. In order to improve visualization, as to a protective conductor line 6, a wire 25, and a terminal 29 shown in FIG. 2, the width of each of these is shown enlarged from the actual size, and only a part of these are shown.

The liquid crystal display device 1 has a TFT substrate 2 as a first substrate, a CF substrate 3 as a second substrate, a liquid crystal layer 4 held between the TFT substrate 2 and the CF substrate 3, and a seal member 5 sandwiched by the TFT substrate 2 and the CF substrate 3 and surrounding the liquid crystal layer 4. The TFT substrate 2 has a plurality of thin film transistors (TFT), to be described later, as switching elements. The CF substrate 3 has a glass substrate 31 and a color filter (CF) 33 formed on the glass substrate 31.

The TFT substrate 2 is formed in a rectangular shape slightly larger than the CF substrate 3, and has an overlap part A that overlaps with the CF substrate 3 and a non-overlap part B that does not overlap with the CF substrate 3. Specifically, a part of the TFT substrate 2 positioned inner than the edge 39 of the CF substrate 3 along the direction toward the center thereof and opposite the CF substrate 3 corresponds to the overlap part A, while a part thereof positioned outer than the edge 39 of the CF substrate 3 along the direction toward the center thereof and not opposite the CF substrate 3 corresponds to the non-overlap part B.

On the overlap part A of the TFT substrate 2, a plurality of pixels including TFTs are arranged in a matrix, and a plurality of wires 25 connected to the respective TFTs extend from the overlap part A to the non-overlap part B. The plurality of wires 25 are source signal lines, for example, connected to the source electrodes of TFTs (or drain signal lines connected to drain electrodes). The plurality of wires 25 are covered by a protective film 28 to prevent corrosion.

On the non-overlap part B of the TFT substrate 2, on the other hand, a group of terminals 29a including a plurality of terminals 29 connected to the respective ends of the wires 25 are provided. The end portions of the plurality of wires 25 are gathered toward the terminals 29a, and connected to a plurality of terminals 29 arranged one dimensionally along the edge 22 of the TFT substrate 2 (see FIG. 2). A flexible printed substrate having a driver IC mounted thereon may be connected to the terminals 29a, or a driver IC may be directly mounted to the terminals 29a.

On the protective film of the TFT substrate 2, a plurality of protective conductor lines 6 for protecting the protective film 27 and the plurality of wires 25 from mechanical impact are formed, lying across the boundary between the overlap part A and the non-overlap part B. That is, the plurality of protective conductor lines 6 are arranged so that they overlap with the edge 39 of the CF substrate 3 in a plan view. Further, the plurality of protective conductor lines 6 are covered by the protective film 28 for preventing corrosion.

The plurality of protective conductor lines 6 are arranged so that they correspond to each wires 25 one by one. For example, each of the plurality of protective conductor lines 6 is arranged so as to overlap with a corresponding wire 25 among the plurality of wires 25 in a plan view. Specifically, the plurality of protective conductor lines 6 are each formed in a linear shape, similar to a corresponding wire 25, near the boundary between the overlap part A and the non-overlap part B and arranged to overlap with the corresponding wire 25.

Figure 3A:
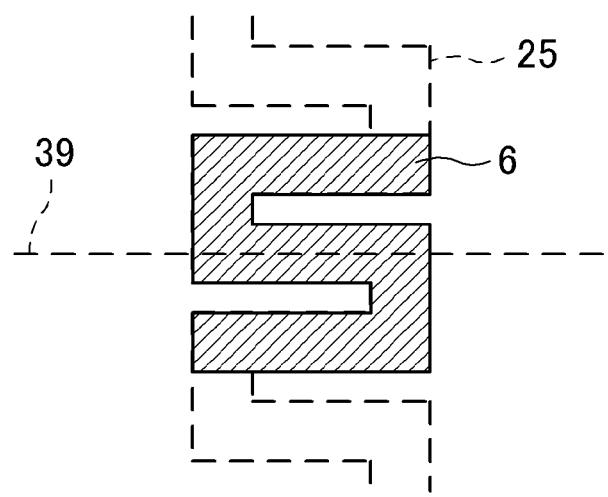
FIG. 3A is a plan view schematically showing an example of a structure of a protective conductor line.
Figure 3B:
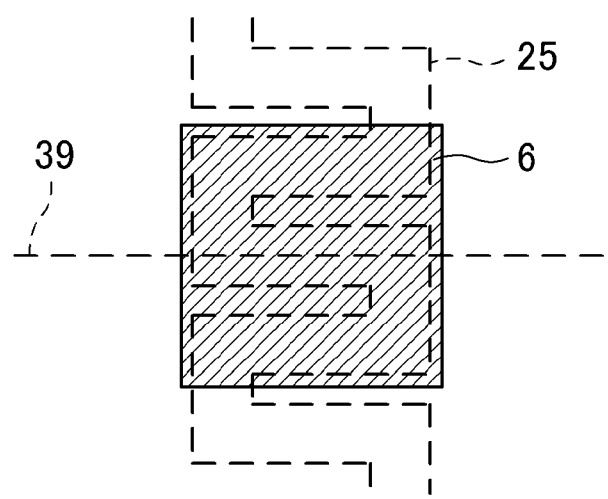
FIG. 3B is a plan view schematically showing an example of a structure of a protective conductor line.
Figure 3C:
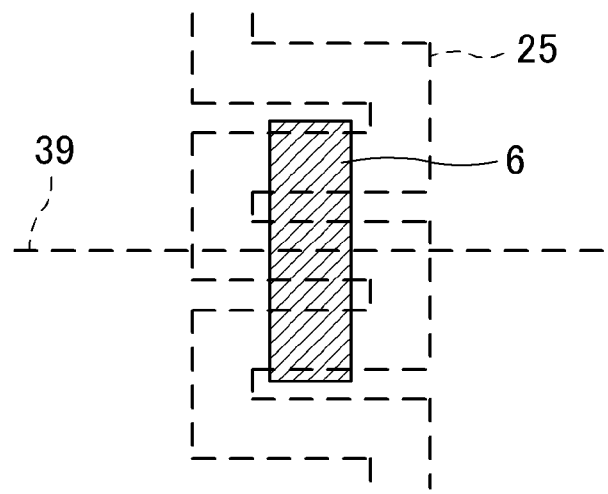
FIG. 3C is a plan view schematically showing an example of a structure of a protective conductor line.

Note here that, of the plurality of wires 25, a wire 25 connected to a central terminal 29 of the group of terminals 29 may be formed in a meandering shape so as to ensure a length closer to that of the wires 25 connected to the both end terminals 29 of the group of terminals 29. In this case, the protective conductor line 6 may be formed in a meandering shape similar to the wires 25, in a shape wholly covering the meandering wire 25, or in a shape partially covering the meandering wire 25, as shown in FIGS. 3A to 3C.

The plurality of protective conductor lines 6 are electrically connected to the respective wires 25. For example, a protective conductor line 6 and a wire 25 corresponding to each other are electrically connected to each other via connection conductors 67 and 69 formed on the protective film 28. Specifically, the connection conductor 67 formed on the non-overlap part B side of the protective conductor line 6 is formed integrally with the terminal 29 connected to the wire 25 through the protective films 27, 28. That is, the terminal 29 constitutes a via section. Also, the connection conductor 67 has a via section 672 connected to the protective conductor line 6 through the protective film 28. Meanwhile, the connection conductor 69 formed on the overlap part A side of the protective conductor line 6 has a via section 691 connected to the wire 25 through the protective films 27, 28 and a via section 692 connected to the protective conductor line 6 through the protective film 28.

The above described aspect is not limiting, and the plurality of protective conductor lines 6 do not necessarily overlap with the respective corresponding wires 25 in a plan view as long as the protective conductor lines 6 are arranged to correspond to each wires 25 one by one and electrically connected to the corresponding wire. Further, the plurality of protective conductor lines 6 may be connected to the respective wires 25 not only via two connection conductors 67 and 69, but also via one connection conductor or via three or more connection conductors, as long as it is ensured that the protective conductor line 6 and corresponding wire 25 are at the same potential.

Each protective conductor line 6 has a two-layered structure including a transparent conductive layer 61 formed on the protective film 27 and a metal layer 62 formed on the transparent conductive layer 61. The transparent conductive layer 61 is made of transparent conductive oxide, such as indium tin oxide (ITO). The metal layer 62 is made of metal, such as Cu or Al, for example. This aspect is not limiting, and the protective conductor line 6 may have a single layered structure including either of the transparent conductive layer 61 or the metal layer 62, and also may have a multi-layered structure including three or more other conductive layers.

The transparent conductive layer 61 included in the protective conductor line 6 is preferably made of transparent conductive oxide, such as ITO, for example, and has a thickness of about 200 to 400 nm. The metal layer 62 included in the protective conductor line 6 is preferably made of metal, such as Cu or Al, for example, and has a thickness of about 200 to 400 nm. The protective film 28 formed on the protective conductor line 6 is preferably made of transparent insulating material, such as SiN, for example, and has a thickness of about 300 to 600 nm. The protective film 27 formed under the protective conductor line 6 is made of transparent insulating material, such as SiN, for example, and has a thickness of about 300 to 600 nm. The wire 25 formed under the protective film 27 is preferably made of metal, such as Cu or Al, for example, and has a thickness of about 200 to 400 nm.

FIGS. 4A to 4H are process drawings showing an example of manufacturing process for the TFT substrate 2. The left half of each drawing shows an area where a TFT is formed, while the right half shows an area where the protective conductor line 6 is formed. Each drawing shows a state in which thin film processing through a photolithography process and etching is completed, and a photoresist is removed. A photolithography process here refers to a process including a series of treatment for forming a resist pattern, including application of photoresist, selective exposure using a photo mask, and image development, and detailed description thereof will not be given hereafter.

Figure 4A:
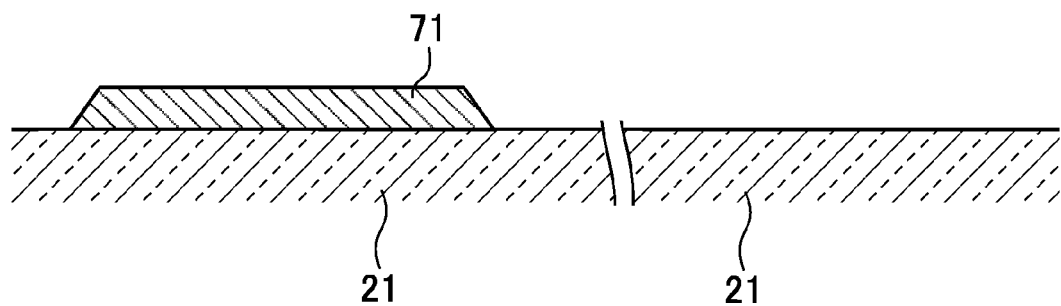
FIG. 4A is a process drawing showing an example of manufacturing process for a TFT substrate.

At the process shown in FIG. 4A, a gate electrode 71 made of metal, such as Cu or Al, is formed on the glass substrate 21 in the area where the TFT is formed. Specifically, a metal film made of metal, such as Cu or Al, is initially formed by means of sputtering. Then, a resist pattern is formed on the metal film by a photolithography process, and the metal film is then etched. Thereafter, the photoresist is removed. Through the above steps, the gate insulator 71 is formed.

Figure 4B:
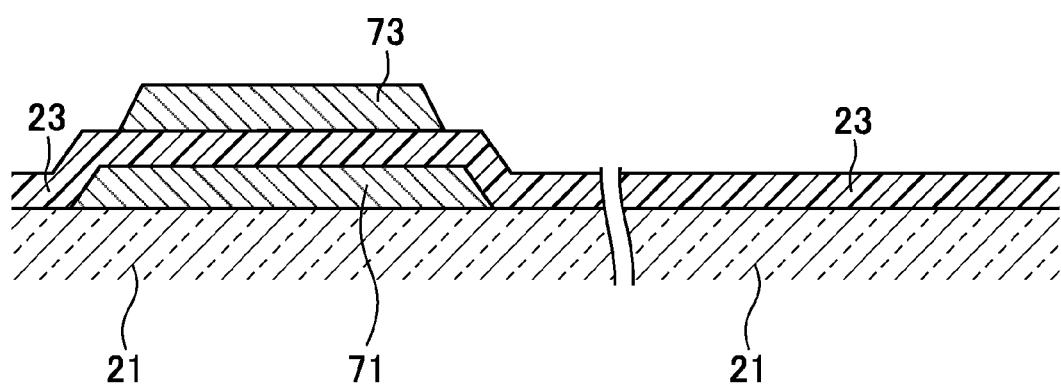
FIG. 4B is a process drawing showing an example of manufacturing process for a TFT substrate.

At the process shown in FIG. 4B, an insulating film 23 made of transparent insulating material, such as SiN, and covering the glass substrate 21 and the gate insulator 71 is formed, and a semiconductor layer 73 made of semiconductor, such as amorphous Si (a-Si), is formed on the gate electrode 71 and the insulating film 23. Specifically, ammonia gas, silane gas, and nitrogen gas are initially introduced into a reaction chamber of a CVD device to form an insulating film made of SiN. Next, silane gas and hydrogen gas are introduced to form a semiconductor layer made of amorphous Si. Thereafter, a resist pattern is formed on the semiconductor layer by a photolithography process, and the semiconductor layer is then etched. After that, the photoresist is removed. Through the above steps, the insulating film 23 and the semiconductor layer 73 are formed.

Figure 4C:
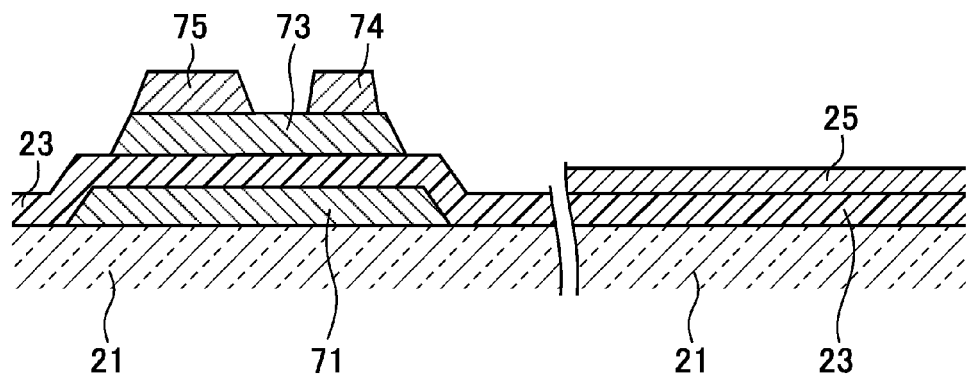
FIG. 4C is a process drawing showing an example of manufacturing process for a TFT substrate.

At the process shown in FIG. 4C, a source electrode 74 and a drain electrode 75 made of metal, such as Cu or Al, are formed on the semiconductor layer 73, whereby a formation of TFT is completed. At this process, the plurality of wires 25 made of metal, such as Cu or Al, are also formed on the insulating film 23. The plurality of wires 25 are source signal lines connected to the source electrodes 74, extending through the area where the protective conductor line 6 is formed to the area where the terminals 29a are formed (see FIG. 1). Specifically, a metal film made of metal, such as Cu or Al, is initially formed by means of sputtering. Next, a resist pattern is formed on the metal film by a photolithography process, and the metal film is then etched. Thereafter, the photoresist is removed. Through the above steps, the source electrode 74, the drain electrode 75, and the plurality of wires 25 are formed.

Figure 4D:
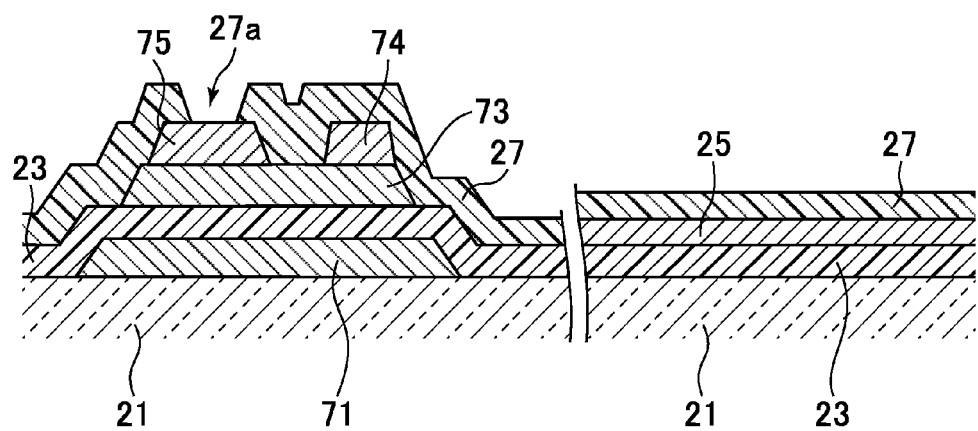
FIG. 4D is a process drawing showing an example of manufacturing process for a TFT substrate.

At the process shown in FIG. 4D, the protective film 27 made of transparent insulating material, such as SiN, and covering the plurality of wires 25, the source electrode 74, and the drain electrode 75 are formed. Further, a hole 27a is formed in the protective film 27, with the drain electrode 75 exposed at the bottom thereof. Specifically, ammonia gas, silane gas, and nitrogen gas are initially introduced into the reaction chamber of the CVD device to form an SiN protective film. Next, a resist pattern is formed on the protective film by a photolithography process, and the protective film is then etched. Thereafter, the photoresist is removed. Through the above steps, the protective film 27 having the hole 27a is formed.

Figure 4E:
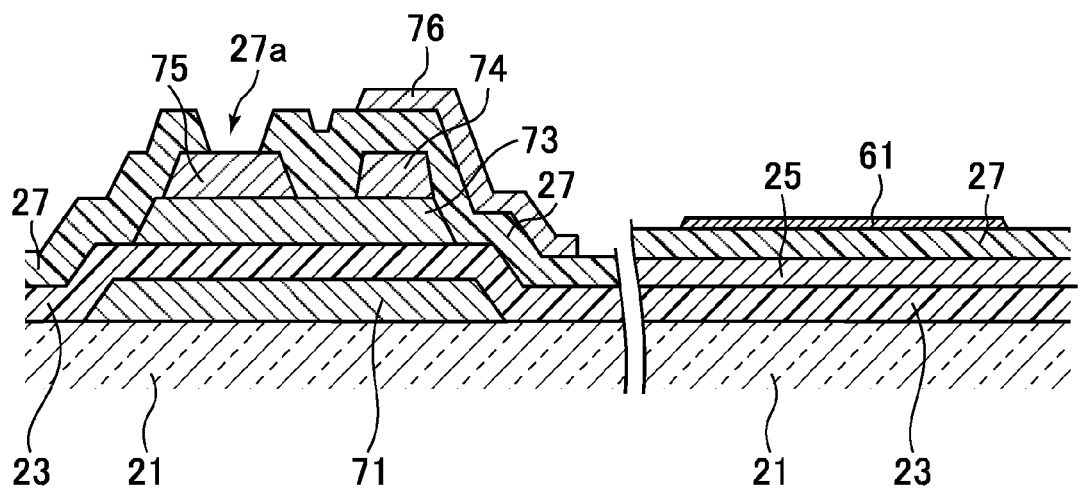
FIG. 4E is a process drawing showing an example of manufacturing process for a TFT substrate.

At the process shown in FIG. 4E, a common electrode 76 made of transparent conductive material, such as indium tin oxide (ITO), is formed on the protective film 27. This common electrode 76 is an example of the first transparent electrode. At this process, the transparent conductive layer 61 made of transparent conductive oxide, such as ITO, is also formed on the protective film 27 in the area where the protective conductor line 6 is formed. Specifically, a transparent conductive film made of ITO is initially formed on the protective film 27 by means of sputtering. Next, a resist pattern is formed on the transparent conductive film by a photolithography process, and the transparent conductive film is then etched. Thereafter, the photoresist is removed. Through the above steps, the common electrode 76 and the transparent conductive layer 61 are formed.

Figure 4F:
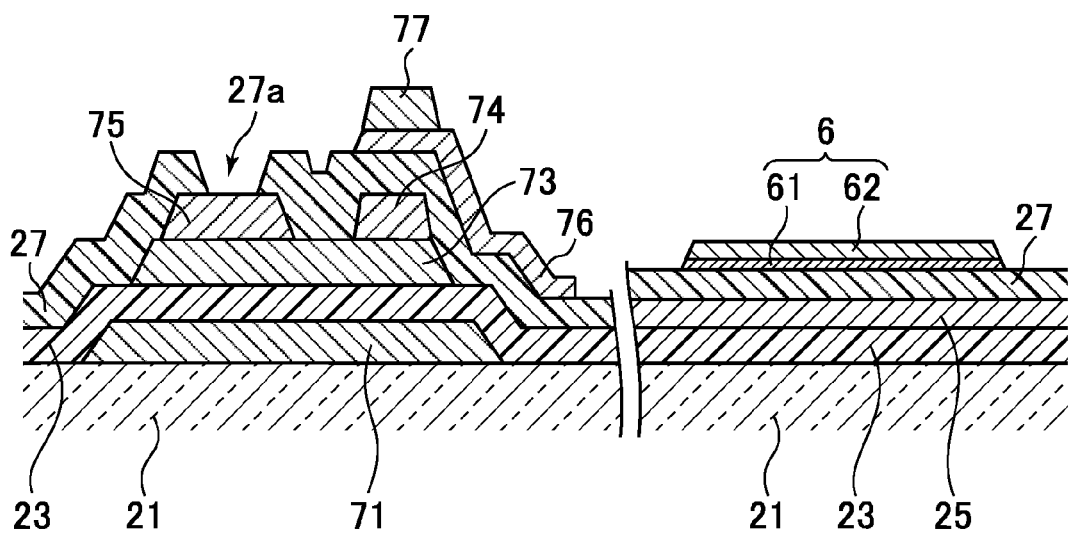
FIG. 4F is a process drawing showing an example of manufacturing process for a TFT substrate.

At the process shown in FIG. 4F, a common signal line 77 made of metal, such as Cu or Al, and connected to the common electrode 76 is formed. Further, at this process, a metal layer 62 made of metal, such as Cu or Al, is also formed on the transparent conductive layer 61 in the area where the protective conductor line 6 is formed. Specifically, a metal film made of metal, such as Cu or Al, is initially formed by means of sputtering. Next, a resist pattern is formed on the metal film by a photolithography process, and the metal film is then etched. Thereafter, the photoresist is removed. Through the above steps, the common signal line 77 and the metal layer 62 are formed.

Figure 4G:
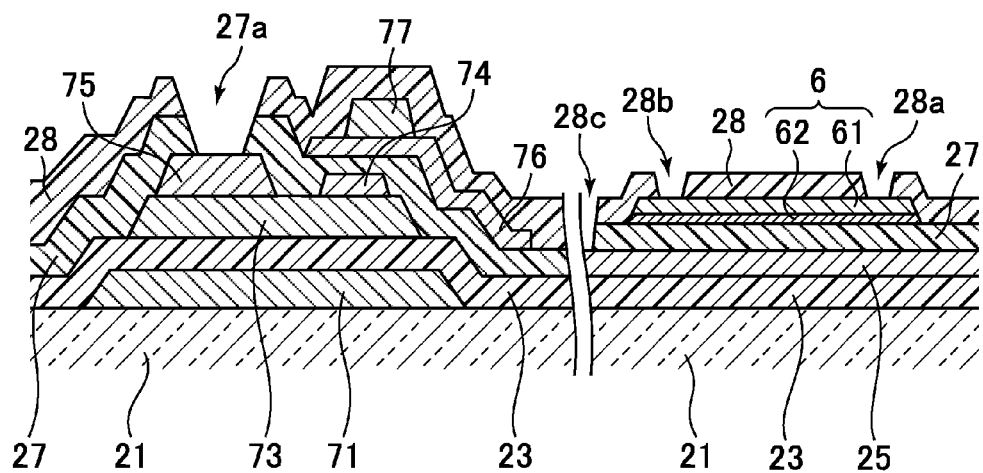
FIG. 4G is a process drawing showing an example of manufacturing process for a TFT substrate.

At the process shown in FIG. 4G, the protective film 28 made of transparent insulating material, such as SiN, and covering the common electrode 76, the common signal line 77, and the metal layer 62 is formed. Further, similar to the protective film 27, a hole 27a is formed in the protective film 28, with the drain electrode 75 exposed at the bottom thereof. In the area where the protective conductor line 6 is formed, holes 28a, 28b are formed in the protective film 28, with the protective conductor line 6 exposed at the respective bottoms thereof, and a hole 28c is formed in the protective films 27, 28, with the wire 25 exposed at the bottom thereof. Specifically, ammonia gas, silane gas, and nitrogen gas are initially introduced into the reaction chamber of the CVD device to thereby form an SiN protective film. Next, a resist pattern is formed on the protective film by a photolithography process, and the protective film is then etched. Thereafter, the photoresist is removed. Through the above steps, the protective film 28 having the holes 27a and 28a to 28c is formed. Note that a hole for forming the terminal 29 (see FIG. 1) is also formed in the non-overlap part B at this process.

Figure 4H:
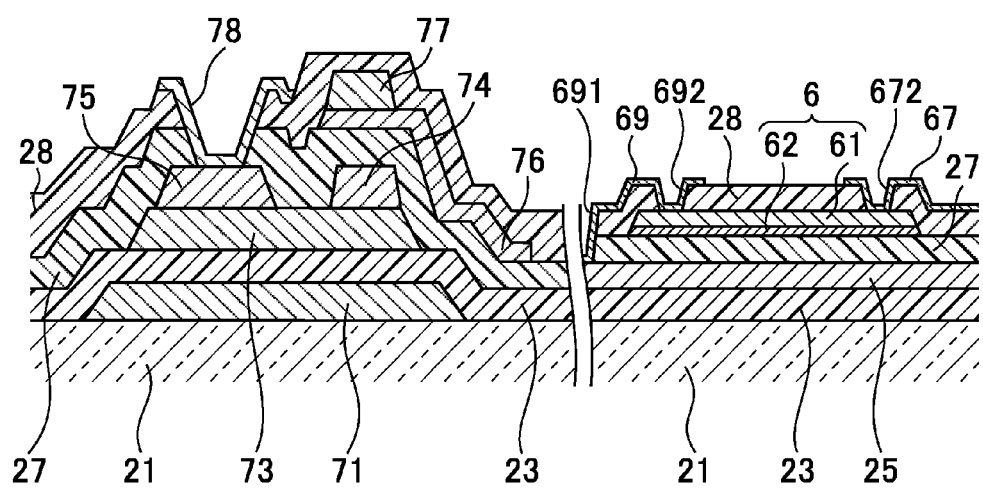
FIG. 4H is a process drawing showing an example of manufacturing process for a TFT substrate.

At the process shown in FIG. 4H, a pixel electrode 78 made of transparent conductive material, such as indium tin oxide (ITO), is formed on the protective film 28 and in the hole 27a. The pixel electrode 78 is connected to the drain electrode 75 through the hole 27a. The pixel electrode 78 is an example of the second transparent electrode. At this process, the connection conductors 67 and 69 made of transparent conductive material, such as ITO, are formed on the protective film 28 and in the respective holes 28a to 28c in the area where the protective conductor line 6. The connection conductors 67 and 69 are connected to the protective conductor line 6 and the wire 25, through the holes 28a to 28c. Specifically, a transparent conductive film made of ITO is initially formed on the protective film 28 by means of sputtering. Next, a resist pattern is formed on the transparent conductive film by a photolithography process, and the transparent conductive film is then etched. Thereafter, the photoresist is removed. Through the above steps, the pixel electrode 78 connected to the drain electrode and the connection conductors 67 and 69 connected to the protective conductor line 6 and the wire 25, respectively, are formed. Note that a terminal 29 made of transparent conductive material, such as ITO, is also formed on the non-overlap part B at this process (see FIG. 1).

Through the above described processes, the TFT substrate 2 is completed. Then, the liquid crystal layer 4 is injected into between the TFT substrate 2, the CF substrate 3, and the seal member 5, whereby a liquid crystal display panel is completed. Further, a driver IC or the like is assembled into the liquid crystal display panel, whereby the liquid crystal display device 1 is completed.

Although an embodiment of this application is described above, this application is not limited to the above described embodiment, and various modified embodiments can be made by a person skilled in the art.

Figure 5:
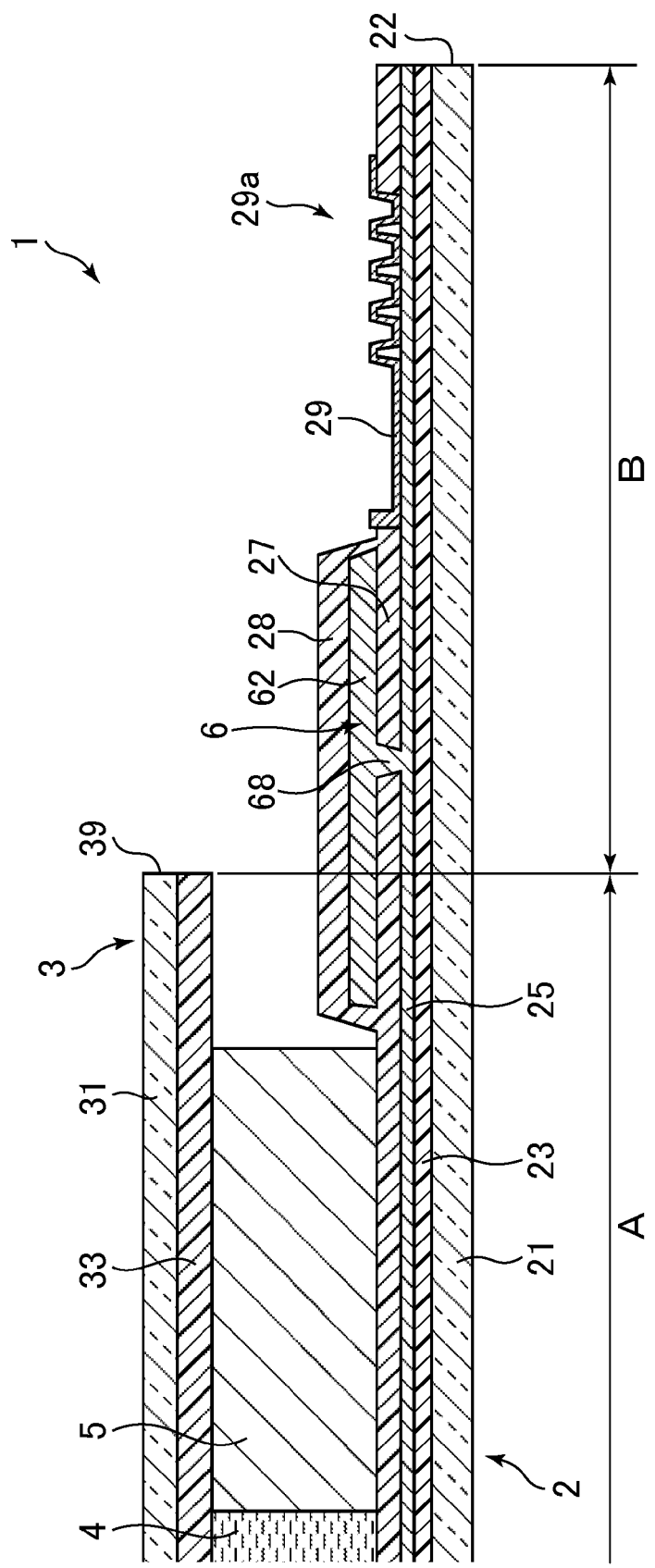
FIG. 5 is a cross sectional view schematically showing major parts of a liquid crystal display device.

That is, although the protective conductor line 6 and the wire 25 are made electrically connected to each other via the connection conductors 67 and 69 formed on the protective film 28 in the above embodiment, this is not limiting. The protective conductor line 6 and the wire 25 may be made electrically connected to each other at one point, as shown in FIG. 5. In the example shown in FIG. 5, the protective conductor line 6 and the wire 25 are made electrically connected to each other via the via section 68 formed on the protective film 27. Specifically, the protective conductor line 6 is composed of the metal layer 62, and the hole formed in the protective film 27 is filled with metallic material same as that of the metal layer 62, whereby the via section 68 for having the protective conductor line 6 and the wires 25 be electrically connected to each other is formed.

Further, although a pixel structure in which the common signal line 77 is formed above the TFT is shown in the above embodiment, this is not limiting, and a pixel structure in which the common signal line 77 is formed in the same layer as the layer where the gate electrode 71 is formed is applicable.

Further, although an IPS (In Plane Switching) method in which the common electrode 76 and the pixel electrode 78 are formed on the TFT substrate 2 is shown in the above embodiment, this application is applicable to a liquid crystal display device employing TN or VA method.

Further, although an active matrix method in which a TFT is formed for each of the pixels on the TFT substrate 2 is shown in the above embodiment, this application is applicable to a liquid crystal display device employing a simple matrix method.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A liquid crystal display device, comprising:
a first substrate;
a second substrate;
a liquid crystal layer held between the first substrate and the second substrate; and
a seal member sandwiched by the first substrate and the second substrate, for enclosing the liquid crystal layer, wherein
the first substrate comprises:
  an overlap part that overlaps with the second substrate, and
  a non-overlap part that does not overlap with the second substrate,
  a plurality of wires extending from the overlap part to the non-overlap part on a side of the liquid crystal layer,
  a first protective film covering the plurality of wires,
  a plurality of protective conductor lines formed on the first protective film so as to correspond to each of the wires and lie across a boundary between the overlap part and the non-overlap part,
  a second protective film covering the plurality of protective conductor lines, and
  a group of terminals formed on the non-overlap part and connected to the plurality of wires,
wherein each of the plurality of protective conductor lines is electrically connected to each of the corresponding wires,
wherein each of the protective conductor lines comprises a transparent conductive film made of oxide and a metal film formed closer to the first substrate than the transparent conductive film.

2. The liquid crystal display device according to claim 1, wherein each of the plurality of the protective conductor lines overlaps with each of the corresponding wires in a plan view.

3. The liquid crystal display device according to claim 1, wherein
the first substrate further comprises:
a thin film transistor connected to one of the plurality of wires, and covered by the first protective film and a first transparent electrode formed on the first protective film, and
the transparent conductive film of the protective conductor line is made of the same material as that of the first transparent electrode.

4. The liquid crystal display device according to claim 1, wherein
the first substrate further comprises:
a thin film transistor connected to one of the plurality of wires, and covered by the first protective film,
a first transparent electrode formed on the first protective film, and
a metal wire formed on the first transparent electrode,
wherein the transparent conductive film of the protective conductor line is made of the same material as that of the first transparent electrode, and the metal film of the protective conductor line is made of the same material as that of the metal wire.

5. The liquid crystal display device according to claim 1, wherein
the first substrate further comprises:
a thin film transistor connected to one of the plurality of wires, and covered by the first protective film,
a first transparent electrode formed on the first protective film, and
a metal wire formed on the first transparent electrode, and wherein
the protective conductor line is made of the same material as that of the metal wire.

6. The liquid crystal display device according to claim 1, wherein
the protective conductor line is electrically connected to the wire via a connection conductor having a first via section connected to the wire through the first protective film and the second protective film, and a second via section connected to the protective conductor line through the second protective film.

7. The liquid crystal display device according to claim 6, wherein
the first substrate further comprises:
a thin film transistor connected to one of the plurality of wires, and covered by the first protective film, and
a second transparent electrode formed on the second protective film, and wherein
the connection conductor is made of the same material as that of the second transparent electrode.

8. The liquid crystal display device according to claim 1, wherein each of the plurality of the protective conductor lines is electrically connected to each of the corresponding wires at only one point.

9. The liquid crystal display device according to claim 1, wherein each of the plurality of the protective conductor lines is electrically connected to each of the corresponding wires at two or more points.

10. A liquid crystal display device, comprising:
a first substrate;
a second substrate;
a liquid crystal layer held between the first substrate and the second substrate; and
a seal member sandwiched by the first substrate and the second substrate, for enclosing the liquid crystal layer, wherein the first substrate comprises:
an overlap part that overlaps with the second substrate, and a non-overlap part that does not overlap with the second substrate,
a plurality of wires extending from the overlap part to the non-overlap part on a side of the liquid crystal layer,
a first protective film covering the plurality of wires,
a plurality of protective conductor lines formed on the first protective film so as to correspond to each of the wires and lie across a boundary between the overlap part and the non-overlap part,
second protective film covering the plurality of protective conductor lines, and
a group of terminals formed on the non-overlap part and connected to the plurality of wires, wherein each of the plurality of protective conductor lines is electrically connected to each of the corresponding wires, and the protective conductor line comprises a transparent conductive film made of oxide,
wherein the first substrate further comprises: a thin film transistor connected to one of the plurality of wires and covered by the first protective film, and the protective conductor line includes a metal layer formed on the first protective film.

11. The liquid crystal display device according to claim 10, wherein each of the plurality of the protective conductor lines is electrically connected to each of the corresponding wires at only one point.

12. The liquid crystal display device according to claim 10, wherein each of the plurality of the protective conductor lines is electrically connected to each of the corresponding wires at two or more points.

13. The liquid crystal display device according to claim 10, wherein each of the plurality of the protective conductor lines overlap with each of the corresponding wires in a plan view.

14. The liquid crystal display device according to claim 10, wherein the transparent conductive film of the protective conductor line is made of the same material as that of the first transparent electrode.

15. The liquid crystal display device according to claim 10, wherein the protective conductor line comprises a metal film formed closer to the first substrate than the transparent conductive film.

16. The liquid crystal display device according to claim 15, wherein the metal film of the protective conductor line is made of the same material as that of the metal wire.

17. The liquid crystal display device according to claim 10, wherein the protective conductor line is electrically connected to the wire via a connection conductor having a first via section connected to the wire through the first protective film and the second protective film, and a second via section connected to the protective conductor line through the second protective film.

18. The liquid crystal display device according to claim 17, wherein the first substrate further comprises a second transparent electrode formed on the second protective film, wherein the connection conductor is made of the same material as that of the second transparent electrode.

* * * * *